UNITED STATES PATENT OFFICE.

HARRY S. THATCHER, OF LOS ANGELES, CALIFORNIA, ASSIGNOR TO CELITE PRODUCTS COMPANY, OF LOS ANGELES, CALIFORNIA, A CORPORATION OF CALIFORNIA.

PLASTER COMPOSITION.

1,251,842.      Specification of Letters Patent.      Patented Jan. 1, 1918.

No Drawing.      Application filed August 8, 1916. Serial No. 113,708.

*To all whom it may concern:*

Be it known that I, HARRY S. THATCHER, a citizen of the United States, residing at Los Angeles, in the county of Los Angeles and State of California, have invented a new and useful Plaster Composition, of which the following is a specification.

This invention relates to a composition suitable for plastering walls, etc., or for similar purposes, and the main object of the invention is to provide a plaster which will have the hardness generally desired in wall plasters, and will at the same time act as a sound insulator or deadener. In the use of hard wall plasters, the difficulty is encountered that any of the usual plasters that have the desired degree of hardness, act as moderately good conductors of sound, so that in apartment houses, for example, comparatively soft mortar of sand and lime has been largely used instead of hard wall plaster on account of its superior sound insulating quality. This either results in a rough, easily damaged wall surface or requires a finishing coat of hard plaster. I obviate this difficulty by providing a plaster which is a satisfactory sound insulator or deadener and at the same time is as hard or harder than the usual hard wall plaster.

I have discovered that when kieselguhr is mixed with calcined gypsum to form a wall plaster, it will increase the hardness as compared with gypsum alone, for percentages of kieselguhr under about five per cent. by weight (say 20 per cent. by volume). That is to say, a mixture of say five pounds or less of kieselguhr with 100 pounds of calcined gypsum makes a plaster which forms a harder surface when set than is the case with an ordinary calcined gypsum. This hardening effect of the kieselguhr seems to reach its maximum at about the proportion of five per cent. of kieselguhr in the total composition, and as the proportion is increased beyond that amount, the hardness decreases. This hardening effect may be attributed to the peculiar colloidal property of the kieselguhr, the same being a non-crystalline silica having marked colloidal properties, and capable of increasing the binding action of the calcium sulfate of the gypsum, when in the presence of water, in a manner that is not possible with ordinary silica sand or crystalline silica. At the same time, the kieselguhr, by reason of its porous cellular nature, gives a certain openness of structure to the plaster wall or body, which enables it to act as an effective sound deadener.

Other important objects of the invention are to increase the plasticity of the plaster, to increase the spreading quality and sand carrying capacity thereof and to decrease the weight of the plaster for a given bulk, and generally to provide for increased economy in the use of the plaster. The kieselguhr when mixed with calcined gypsum as according to my invention, produces a plaster which is more plastic than a plaster made with calcined gypsum without kieselguhr. This enables my improved plaster to go farther, either by spreading over a greater surface or by enabling it to be used with a greater proportion of sand without rendering the plaster mortar too stiff or crumbly. For this reason my improved plaster has the advantage of economy, as well as of strength, hardness, and sound deadening quality. Furthermore, on account of the comparative lightness of the kieselguhr, a given weight of the plaster will occupy a greater volume, in proportion to the amount of kieselguhr contained, thereby contributing to the economy in the use of the plaster. A further important advantage of my plaster in connection with its high degree of plasticity, is that it enables calcined gypsum to be used which has partly lost its plastic property by long exposure to the air or otherwise. The addition of the ground kieselguhr to such gypsum increases the plasticity so that it may be used satisfactorily.

Another object of my invention is to dispense with the use of organic retardants for the plaster, such as are now in general use, and to replace such retardants with a retardant which is cheaper and more permanent in its nature. The kieselguhr in the mixture made according to my invention acts as an effective retardant, and enables the plaster to set slowly, evenly, and without checking or cracking.

The kieselguhr used in my composition may be commercial air dried uncalcined kieselguhr, crushed, ground, or otherwise reduced to a suitable state of division, say about 200 mesh. Other forms of non-crystalline silica having colloidal properties may be used in place of the kieselguhr, for example, tufa, volcanic ash, or opaline silica. I prefer however, to use kieselguhr or diatomaceous earth, on account of its porosity and its hygroscopic nature, which are of importance in contributing to the lightness, strength and hardness of the plaster, and to the plasticity.

The gypsum used in my composition may be ground to about 200 mesh, and is preferably calcined before grinding, although, in some cases, it may be calcined after grinding, or even after mixing with the kieselguhr or non-crystalline silica.

My improved plaster composition is preferably made by mixing ground calcined gypsum with ground kieselguhr, in the proportion of about five pounds of kieselguhr to one hundred pounds of calcined gypsum, the ground materials being mixed dry and packed in suitable containers, for example bags, until used. The proportion of kieselguhr used may, however, in some cases be as low as two per cent. of kieselguhr in the total mixture or in case any considerable hardening effect is not required the amount of kieselguhr may be increased considerably beyond the proportion for maximum hardening effect, say up to fifteen per cent. by weight of kieselguhr in the mixture.

In case it is desired to modify the plaster for special purposes, other constituents, such as any of the well known waterproofing materials, or coloring materials, may be added to the mixture; and in some cases it may be desirable to add a certain proportion of ground lime, either quick lime or hydrated lime, in order, for example, to counteract any objectionable corrosive action due to the presence of the kieselguhr.

While in some cases I prefer to grind the kieselguhr and calcined gypsum separately and then mix them, as above described, in other cases I prefer to intergrind them as set forth in my application Ser. No. 104,166, filed June 17, 1916, for plaster or cement composition and method of making the same. My present invention, broadly considered, covers the composition made by mixing either with or without intergrinding.

What I claim is:

1. A plaster composition comprising uncalcined kieselguhr and calcined gypsum both in state of fine division and mixed together in dry condition.

2. A plaster composition comprising uncalcined kieselguhr and calcined gypsum mixed together in a state of fine division, the proportion of kieselguhr in the mixture being such as to make a plaster of greater hardening property than calcined gypsum alone.

3. A plaster composition comprising uncalcined kieselguhr and calcined gypsum mixed together in a state of fine division, in the proportion of about five parts of kieselguhr to one hundred parts of calcined gypsum, by weight.

4. A plaster composition comprising kieselguhr, calcined gypsum and lime.

5. A plaster composition comprising calcined gypsum mixed with non-crystalline silica having colloidal properties.

In testimony whereof I have hereunto set my hand, at Los Angeles, California, this 31st day of July 1916.

HARRY S. THATCHER.